Sept. 15, 1970　　　R. W. BUSHMEYER ET AL　　　3,528,505
EARTHWORKING TOOL RELEASE MECHANISM Filed Aug. 24, 1967　　　　　　　　　　　　　3 Sheets-Sheet 1

INVENTORS
RICHARD W. BUSHMEYER.
THOMAS O. MARX

WILSON, SETTLE & BATCHELDER.
ATT'YS.

Sept. 15, 1970   R. W. BUSHMEYER ET AL   3,528,505
EARTHWORKING TOOL RELEASE MECHANISM
Filed Aug. 24, 1967   3 Sheets-Sheet 2
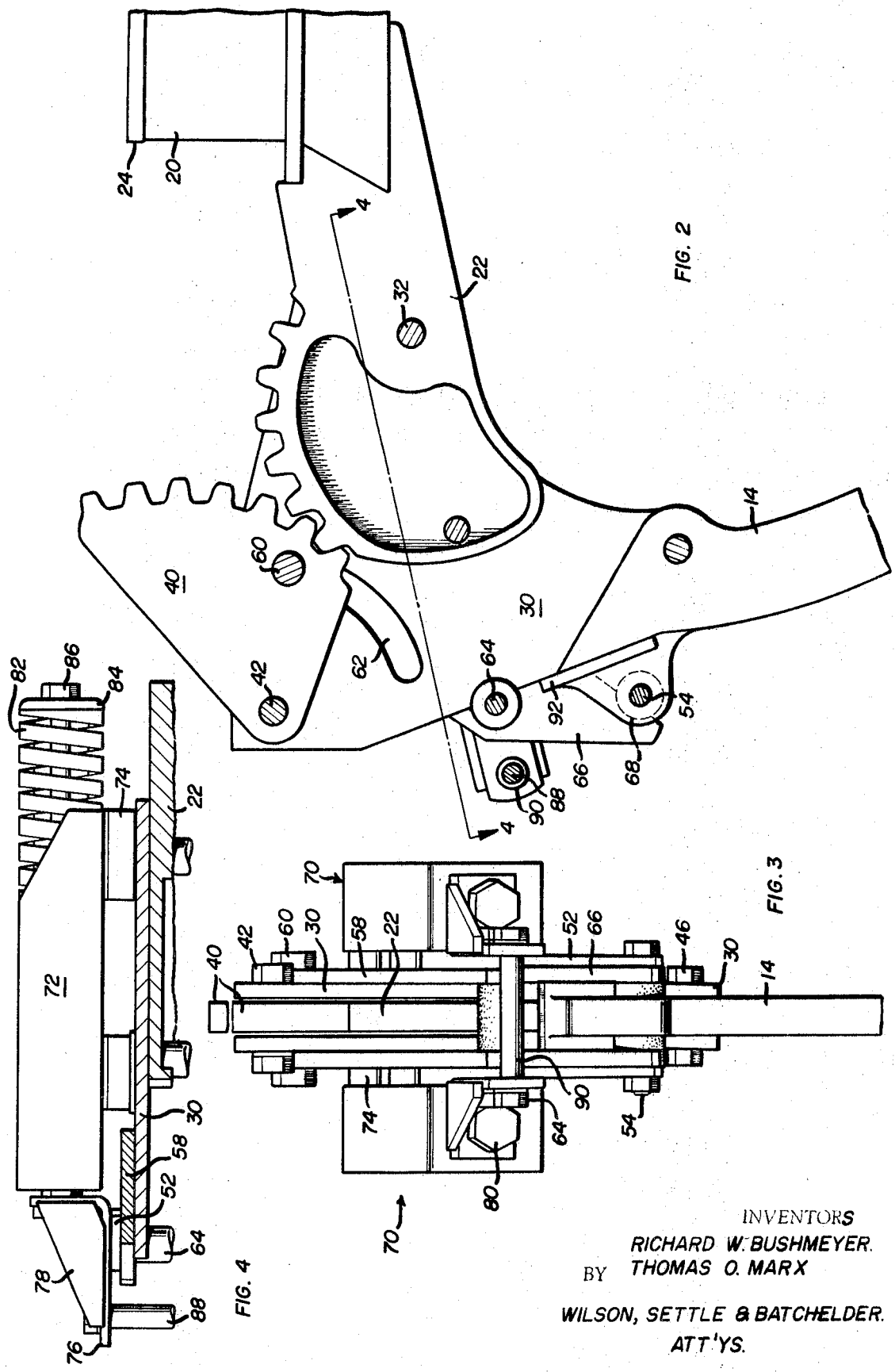
INVENTORS
RICHARD W. BUSHMEYER.
BY THOMAS O. MARX
WILSON, SETTLE & BATCHELDER.
ATT'YS.

Sept. 15, 1970     R. W. BUSHMEYER ET AL     3,528,505
EARTHWORKING TOOL RELEASE MECHANISM Filed Aug. 24, 1967                         3 Sheets-Sheet 3

INVENTORS
RICHARD W. BUSHMEYER.
BY   THOMAS O. MARX
WILSON, SETTLE & BATCHELDER.
ATT'YS.

United States Patent Office 3,528,505
Patented Sept. 15, 1970

3,528,505
EARTHWORKING TOOL RELEASE MECHANISM
Richard W. Bushmeyer, Rockford, and Thomas O. Marx, South Beloit, Ill., assignors to J. I. Case Company, Racine, Wis., a corporation of Wisconsin
Filed Aug. 24, 1967, Ser. No. 663,066
Int. Cl. A01b 61/04
U.S. Cl. 172—264                                     21 Claims

ABSTRACT OF THE DISCLOSURE

An implement, such as a plow, having a main beam and an earthworking tool releasably connected to the main beam. The release mechanism includes spaced pivots which allow the mechanism to yield to either a clockwise or counterclockwise excessive force exerted on the earthworking tool.

BACKGROUND OF THE INVENTION

The present invention relates generally to agricultural implements, such as plows, and more specifically to an improved trip and cushioning mechanism for a mold board plow or the like.

Tripping devices for earthworking tools are well known in the art and generally allow the earthworking tool to swing or pivot about a fixed connection on the main portion of the unit when abnormal draft conditions are encountered which might damage the implement.

Generally, this is accomplished by pivotally connecting the working tool to a fixed portion of the implement with some type of spring or equivalent release mechanism that allows pivotal movement relative to the working tool and the main beam of the implement when an abnormal force is exerted upon the tool. In this type of device, it has been rather common practice to have the unit moved to a completely tripped position when the spring force is overcome by an abnormal draft force on the tool. Thus, returning the working tool to its operated position has required either that the operator of the propelling vehicle dismount and manually return the unit to its operative position or that he back up the implement to allow the soil to force the working tool back to its operating position.

One alternative to this arrangement has been to provide a mechanical unit for returning the working tool to its operative position after it has been tripped. One such mechanical unit which has been proposed is a hydraulic cylinder between the working tool and the main beam of the implement which will return the tool to its operative position without stopping the implement. The primary problem with this type of arrangement is that in pivoting the plow bottom about the pivot on the main portion of the implement, excessive forces are required for returning the plow bottom to its operative position. Another disadvantage is the extreme cost involved in equipping an implement, such as a plow, with the hydraulic cylinders as well as the necessary ancillary equipment.

A further disadvantage of this type of unit is that the unit is not capable of compensating for vertical forces that may be applied upwardly against the lower surface of the plow bottom, as when the bottom edge of the plow bottom engages an upwardly inclined surface of an obstruction, such as a rock.

SUMMARY OF THE INVENTION

Generally speaking the present invention provides a unique tripping and cushioning mechanism which alleviates all of the shortcomings of the prior art devices.

The primary object of the present invention is to provide a tripping and cushioning mechanism for an earthworking implement which is capable of yielding under abnormal forces on the lower or upper surface of the earthworking tool.

Another object is to provide a tripping and cushioning mechanism which will immediately return the working tool to its operative position after an abnormal draft force, caused by an obstruction, is reduced to a normal draft force.

A still further object is to provide a tripping and cushioning mechanism which will return the working tool to a favorable position so that the soil forces may be utilized to return the tool to its working position.

Other objects and features of the invention will become apparent to those skilled in the art after a consideration of the following detailed description, taken in conjunction with the accompanying drawings.

In the drawings:

FIG. 2 is an enlarged fragmentary side elevation view of the tripping and cushioning mechanism, with parts broken away;

FIG. 3 is a rear elevational view of the implement shown in FIG. 1;

FIG. 4 is a fragmentary sectional view taken along lines 4—4 of FIG. 2;

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
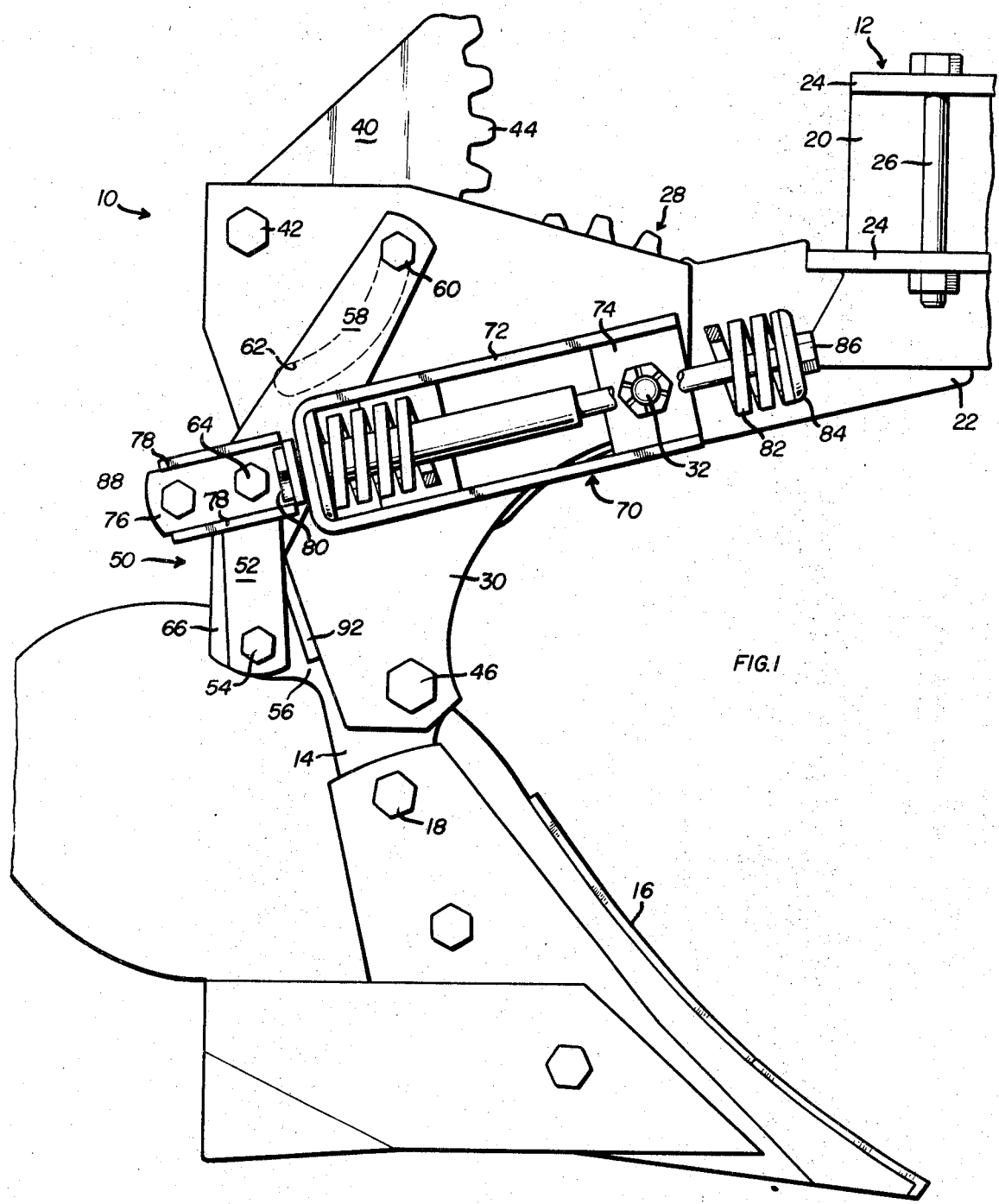
FIG. 1 is a side elevation view of the present invention adapted to support an earthworking tool, such as a plow bottom, on the main portion of the implement.

Referring to the drawings wherein like numerals are used to designate like parts throughout, FIG. 1 shows a tripping and cushioning mechanism of the present invention, generally designated at 10, in its normal operating position on an earthworking implement, such as a plow. The mechanism 10 is interposed between a substantially horizontally extending rigid support 12 and a plow standard 14 to which a plow bottom or share 16 is rigidly attached, as for example, by bolts 18.

The rigid support 12 is illustratively shown as including the main plow beam 20 and a main beam extension or supporting bracket 22 fixedly secured to the main beam by plates 24 interconnected by bolt 26. The rear end of the plow support 12, and more particularly the extension 22, has a contacting surface 28 in the form of gear teeth, for a purpose to be described later.

The mechanism 10 includes a pair of gusset plates 30 disposed on opposite sides of the main beam extension 22 and pivotally mounted on a main or upper pivot point defined by a pin or bolt 32. The spaced gusset plates 30 may be termed rotatable means or members coupled to the plow support 12 and more particularly to the main beam extension 22.

A member 40 is supported for pivotal movement between the spaced gusset plates 30 by a bolt 42. The member 40 has a contacting surface 44 in the form of gear teeth meshing with the first gear teeth 28. As clearly shown in FIG. 2, the two gears are elliptical, for a purpose to be described later.

The plow standard or working tool supporting section 14 is likewise supported between the two gusset plates 30 by a bolt 46 defining a secondary or lower pivot disposed below the main pivot point 32.

A toggle linkage 50 interconnects the working tool supporting section 14 with the rotatable means or section defined by the spaced gusset plates 30. In the illustrative embodiment, the linkage includes a first link 52 having one end pivotally connected by a bolt 54 to an extenion 56 integral with the working tool support section 14. The second link 58 of the linkage 50 is pivotally supported on a bolt 60 extending through the gear member 40 and the bolt 60 being capable of moving independently of the plates 30 along arcuate slots 62 defined in the plates.

The two links, 52 and 58 are interconnected by a pin or bolt 64 and the link 58 is preferably provided with an extension 66 having a recess 68 aligned with the bolt 54 to define an operative position of the toggle linkage 50. The toggle linkage 50 and the member 40 as well as intermeshing gears 44, 28 define a motion transmitting mechanism for transmitting movement of the plow standard 14 to rotational movement of the gusset plates 30.

The mechanism 10 also includes biasing means for maintaining the rotatable members 30 and the plow standard 14 in a first operative position. As shown in the drawings, in the illustrated embodiment, the biasing means includes a pair of spring assemblies 70 producing a tensile force between the respective pins defined by bolts 32 and 64. Since the two spring assemblies 70 are identical in construction, only one will be described in detail. Each spring assembly 70 includes a U-shaped support member or housing 72 (FIGS. 1 and 4) with the free ends of the legs being interconnected by a bracket 74. The bracket 74 is apertured through which the free end of the bolt 32 extends. The bite portion of the U-shaped member 72 is connected through an angle iron 76 to the bolt 64. The angle iron 76 is preferably reinforced through gusset plates 78 and the first leg of the angle iron has a bolt or rod 80 extending therethrough. The rod 80 also extends through the bite portion of the support member 72 and has a spring 82 telescoped thereon with one end of the spring engaging a surface of the bite portion of support member 72 while the opposite end of the spring contacts a surface of a washer 84. A nut 86 is threaded on the free end of the rod 80 so that rotation of the nut 86 in the appropriate direction will vary the compression of the spring 82.

The second legs of angle irons 76 have a bolt 88 extending therethrough with an appropriate spacer 90 interposed between the adjacent surfaces of the legs so as to properly space the distance between the respective angle irons or brackets 76. The biasing means defined by the spring assemblies 70 will tend to maintain the trip mechanism and consequently the plow bottom 16 in an operative or earthworking position.

Thus, as clearly shown in FIG. 1 the compressive forces of the springs will maintain the toggle linkage 50, as well as the plow standard 14 and rotatable members 30, in the position shown with the link extension 66 limiting the amount of movement of the linkage by engagement of the recess 68 with the pin or bolt 54. Also, the support standard 14 and the gusset plates or rotatable means 30 are limited in relative pivotal movement with respect to each other by a stop 92 (FIG. 2) rigidly secured to the extension 56 and engaging the rear edges of the gusset plates 30.

OPERATION

During normal draft forces encountered by the plow bottom or share from the ground, the spring force of springs 82 is sufficient to maintain the trip mechanism 10 in its position shown in FIG. 1. However, should the plow bottom strike an earth bound obstacle on the upper surface thereof, the abnormal draft force produced by the obstacle will pivot the plow standard 14 and the gusset plates 30 clockwise about the main pivot point defined by the bolt 32. During the clockwise rotation of the plow standard 14 and the plate 30 as a unit, the toggle linkage 50 will be collapsed due to the clockwise rotation of the member 40 with gear teeth 44 in constant mesh with the gear teeth 28 defined on the rear end surface of the beam extension 22. The collapsing movement of the toggle linkage will cause the pivot point 64 to move away from the main pivot 32 thereby progressively increasing the spring force as the linkage is collapsed.

Figure 5:
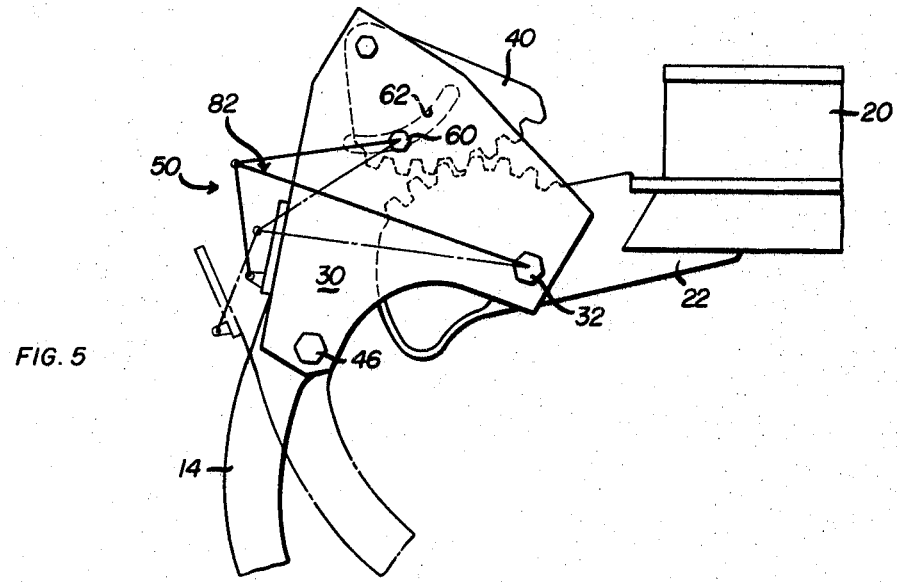
FIG. 5 is a schematic view of the tripping and cushioning mechanism in a partially tripped position.
Figure 6:
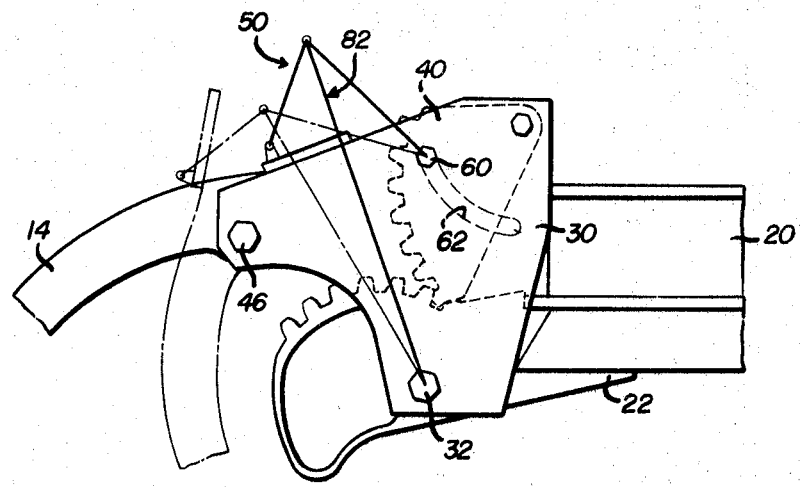
FIG. 6 is a schematic view similar to FIG. 5 showing the mechanism in the fully tripped position.

So long as the abnormal force on the plow share, caused by an earth bound obstacle, is being applied to the upper surface of the plow share, clockwise rotation of the unit about the main pivot point will continue up to a maximum position shown in FIG. 6. This maximum or fully tripped position will raise the plow share sufficiently above the surface of the ground so as to pass over any obstruction in the ground. While the abnormal force is acting upon the plow share in any of the positions between the operative or ground working position shown in FIG. 1 and the maximum tripped position of FIG. 6, the plow standard 14 and the rotatable means 30 will remain in a fixed relative position shown in the solid lines of FIGS. 1, 5 and 6. However, when the abnormal force on the plow share is removed, such as by having the plow share pass the obstacle, the spring force acting between the pivots 32 and 64 will immediately cause the toggle linkage to assume its normal expanded position of FIGS. 1 and 2. Movement of the toggle linkage to its normal operative position will cause counterclockwise rotation of the plow standard 14 about the lower or secondary pivot 46 to move the plow standard from the solid line position of either FIGS. 5 or 6 to the dotted line position thereof. This will return the plow share to a favorable angle of reentry into the soil at any time in which the abnormal force caused by earth bound obstacle is overcome.

This feature of the invention is of extreme importance in designing a practical and desirable unit. Stated another way, by having the plow share at all times returned to a favorable angle of re-entry, the forces necessary for returning the plow share and trip mechanism to a proper earth working position are considerably reduced because the forces from the ground will tend to move the plow share or bottom to its earthworking position. This unique arrangement of parts will considerably reduce the required size and force of the springs 82.

When the plow standard 14 is in the dotted line position of either FIGS. 5 or 6 relative to the rotatable means 30, the forces produced by the springs 82 on the pivot 64 will also tend to move the pivot 60 from the position shown in either FIGS. 5 or 6 to the normal operating position of FIG. 1. This will cause the member 40 to be rotated counterclockwise about the pivot 42 thus tending to return the entire trip mechanism to its operative position of FIG. 1. The elliptical or non-circular configuration of the intermeshing gears 28 and 44 makes it possible to maintain a balance between the resetting force of the springs and the particular position of the plow share which further reduces the required spring force for the mechanism.

Again assuming that the trip mechanism and plow are in their normal operative position shown in FIG. 1 and the plow bottom encounters an obstacle which tends to produce an upwardly directed force against the bottom surface of the plow bottom. The abnormal force on the bottom surface of the plow share will cause the plow standard to pivot counterclockwise about the secondary pivot 46 thereby moving the plow standard 14 from the solid line position shown in FIG. 1 to the dotted line position of FIGS. 5 or 6 and the plates 30 from the position of FIG. 1 toward the position of FIG. 6. The movement of the plow standard 14 will be transmitted through the linkage 50, member 40 and gear teeth 44, 28 to rotate the plates 30 about main pivot 32. During the counterclockwise rotation of the plow standard on the rotatable means or gusset plates 30, the toggle linkage 50 will remain in its expanded position and the clockwise rotation of the gusset plates 30 about the main pivot 32 will increase the compressive force of the springs 82.

The respective counterclockwise rotation of the plow standard on the rotatable means and the clockwise rotation of the rotatable means about the main pivot will continue until the abnormal force on the bottom surface of the plow share is removed. Immediately after the abnormal force is removed, the added spring force will tend to return the tripping mechanism as well as the plow bottom to its normal operative position. Of course, during this movement the intermeshing gears as well as the spring force on the toggle linkage will tend to return the entire unit to its operative position. It should also be noted that the relative movement of the plow standard and the gusset plates 30 will at all times maintain the plow bottom at a favorable angle of re-entry relative to the soil. Thus, the plow standard and plow bottom will move from the position shown in FIG. 1 to the dotted line position shown in either FIGS. 5 or 6.

As can readily be appreciated from the above description, the tripping and cushioning mechanism of the invention provides an efficient and simple manner of preventing damage to a plow bottom or earthworking tool. This simplified mechanism has several distinct advantages, some of which are: (1) a minimum energy storage in the spring or springs during the tripping or cushioning cycle; (2) automatic return of the plow bottom to a favorable angle of re-entry when an obstacle is encountered causing abnormal rearwardly directed forces on the upper surface of the plow shares; (3) an efficient manner of providing a cushioning mechanism as well as a tripping mechanism in a single construction; (4) immediate automatic return of the plow bottom to its operative position from any partially or fully tripped position after the abnormal force is overcome.

While the foregoing description has been directed to a single plow bottom or share connected to a main plow beam through the tripping and cushioning mechanism of the invention, it is to be appreciated that the invention comprehends multiple plow bottoms with a tripping mechanism interposed between each plow bottom and implement frame. Also, while a separate extension has been shown connecting the mechanism to the plow beam or supporting frame, it is to be understood that the gear teeth 28 and main pivot 32 could readily be formed directly on the beam 20.

Thus, while one exemplary embodiment of the invention has been described in detail, it will be apparent to those skilled in the art that the disclosed embodiment may be modified.

We claim:

1. In an implement having a supporting frame, an earthworking tool carrying member and a tripping and cushioning mechanism interposed between the tool carrying member and the frame, the improvement of a section element pivotally mounted on a first pivot on the frame, means pivotally mounting said member on a second pivot on said section element, motion transmitting means operatively interconnected between the section, the member and the frame for transmitting movement of said member to said section element, pivoting said section element on said first pivot and biasing means mounted on said motion transmitting means and pivotable about said first pivot acting on said transmitting means resiliently maintaining said member in a working position when normal draft forces are applied to the tool.

2. An implement as defined in claim 1, in which said motion transmitting means includes a rotating member carried by said section element and cooperating means on said rotating member and said frame for transmitting the movement of said tool carrying member to pivot said section element.

3. An implement as defined in claim 2, in which said cooperating means are intermeshing gear teeth on a surface of said rotating member and on a surface of said frame.

4. An implement as defined in claim 1, in which said motion transmitting means includes a gear rotatable on said section element, cooperating means defining gear teeth rigidly mounted on said frame intermeshing with gear teeth of said gear whereby movement of said tool carrying member will be transmitted through said gear to rotate said section element about said first pivot.

5. An implement as defined in claim 4, in which said cooperating means includes arcuate surfaces on said rotatable member and said frame, each of said arcuate surfaces having gear teeth thereon.

6. In a plow or the like having a main beam, a generally vertical plow standard, a plow bottom fixed to the lower portion of said plow standard, and a release mechanism interposed between said beam and standard normally maintaining said bottom in an operative position relative to the beam, the improvement of said release mechanism comprising a rotatable member mounted for pivotal movement on said main beam about a main pivot axis, means defining a secondary pivot on said rotatable member, means mounting said standard on said secondary pivot, and transmitting means cooperating with said standard, said rotatable member and said beam for transmitting movement of said bottom from the operative position caused by abnormal draft forces on the bottom thereby pivoting said rotatable member about said main pivot, said transmitting means including biasing means mounted thereon and pivotable about said main pivot axis resiliently maintaining said plow bottom in the operative position when normal draft forces are encountered by the bottom.

7. A plow as defined in claim 6, in which said transmtting means includes a plate rotatable on said rotatable member, a linkage connecting said plate to said standard and cooperating engaging means on said plate and said beams to rotate said rotatable member in response to movement of said bottom relative to said beam.

8. A plow as defined in claim 7, in which the force of said biasing means is progressively increased as said bottom is moved from said operative position.

9. A plow as defined in claim 7, in which said biasing means and linkage cooperate to return the bottom to a favorable re-entry position when the abnormal draft force is removed whereby forces produced by the soil tend to return the bottom to its operative position.

10. In a tripping and cushioning mechanism interposed between an earthworking tool and a main beam of an implement, an upper section mounted for pivotal movement about a main pivot axis on the main beam, a lower, earthworking tool carrying section pivoted on said upper section at a secondary pivot axis below said main pivot axis, with said lower section disposed in an operative position relative to said beam when normal draft forces are applied to the earthworking tool, said upper and lower sections adapted to pivot as a unit about said main pivot axis in response to a first abnormal force encountered by the earthworking tool and said lower section adapted to pivot on said upper section in response to a second abnormal force encountered by the earthworking implement, means interconnecting said upper and lower sections and biasing means pivotable about said means and said main pivot axis producing a force (1) for resiliently retaining said lower section in the operative position progressively increasing when said first and second abnormal forces are encountered by the tool, and (2) operative to pivot said lower section on said upper section moving said lower section to a re-entry position relative to said beam when the first abnormal force is overcome whereby the forces from the soil on the tool operate to return the tool to its operative position.

11. A tripping and cushioning mechanism as defined in claim 10, in which said means interconnecting said upper and lower sections includes a member rotatable on said upper section, interengaging means on said member and said main beam cooperating to pivot said upper section on said beam when said lower section is moved from said operative position.

12. A tripping and cushioning mechanism as defined in claim 11, in which said interengaging means comprises intermeshing gear teeth on said member and said beam.

13. A tripping and cushioning mechanism as defined in claim 12 in which said gear teeth define elliptical paths on said member and said beam to thereby maintain a balance of the forces in said mechanism as said tool is moved from the operative position and in which the force of said biasing means progressively increases as the tool is moved from the operative position to return said tool to the operative position whenever the abnormal draft forces are removed.

14. In a trip mechanism for an earthworking tool having a beam and a tool assembly connected to said beam by a main pivot for pivotal movement between normal earthworking and tripped positions, said tool assembly comprising, a first section pivotally mounted on said main pivot, a second section having a plow bottom supported thereon and pivotally mounted on said first section, said plow bottom having an operative position relative to said beam, means cooperating with said sections and said beam adapted to assist in pivoting said first section on the main pivot when abnormal draft forces move said bottom from the operative position, and resilient means mounted on said means and pivotable about said main pivot yieldably holding said sections against pivoting relative to each other and said beam while normal draft forces are encountered on said plow bottom and allowing selective pivotal movement of said sections in response to abnormal draft forces acting on the plow bottom.

15. In an implement having a main beam, an earthworking tool, and a tripping and cushioning assembly connecting said tool to said main beam for maintaining said tool in an operating position relative to the main beam when normal draft forces are encountered by the tool and yielding to abnormal draft forces on the tool, said assembly comprising a first section pivotally mounted on the main beam about a first pivot, a second tool supporting section pivoted on said first section about a second pivot, a motion transmitting mechanism interconnecting said sections for rotating said first section about said first pivot in response to movement of said second section relative to said main beam caused by abnormal draft forces on the tool, and biasing means connected to said mechanism and pivotable about said first pivot resiliently maintaining the tool in the operative position, said biasing means being operative to immediately return said tool to the operating position upon removal of the abnormal draft forces on the tool.

16. An implement as defined in claim 15, in which said second section is alternatively movable relative to said main beam by pivotal movement as a unit with the first section about said first pivot in response to first abnormal draft forces on the tool and pivoted about said second pivot in response to second abnormal draft forces, and in which said mechanism and biasing means cooperate to rotate said second section relative to said first section whenever said second abnormal draft force is removed to whereby position the tool relative to said beam to a favorable position relative to the ground so that soil forces tend to return said tool to the operative position.

17. In an implement having a supporting frame, an earthworking tool carrying member and a tripping and cushioning mechanism interposed between the tool carrying member and the frame, the improvement of a section element pivotally mounted on a first pivot on the frame, means pivotally mounting said member on a second pivot on said section element, motion transmitting means including a rotating member carried by said section element and intermeshing gear teeth on said rotating member and said frame for transmitting the movement of said tool carrying member to pivot said section element on said first pivot and biasing means acting on said transmitting means resiliently maintaining said member in a working position when normal draft forces are applied to the tool.

18. In an implement having a supporting frame an earthworking tool carrying member and a tripping and cushioning mechanism interposed between the tool carrying member and the frame, the improvement of a section element pivotally mounted on a first pivot on the frame, means pivotally mounting said member on a second pivot on said section element, motion transmitting means which includes a gear rotatable on said section element, cooperating means defining gear teeth rigidly mounted on said frame intermeshing with gear teeth of said gear whereby movement of said tool carrying member will be transmitted through said gear to rotate said section element about first pivot.

19. An implement as defined in claim 17, in which said cooperating means includes arcuate surfaces on said rotatable member and said frame, each of said arcuate surfaces having gear teeth thereon.

20. In a tripping and cushioning mechanism interposed between an earthworking tool and a main beam of an implement, an upper section mounted for pivotal movement about a main pivot axis on the main beam, a lower, earthworking tool carrying section pivoted on said upper section at a secondary pivot axis below said main pivot axis, with said lower section disposed in an operative position relative to said beam when normal draft forces are applied to the earthworking tool, said upper and lower sections adapted to pivot as a unit about said main pivot axis in response to a first abnormal force encountered by the earthworking tool and said lower section adapted to pivot on said upper section in response to a second abnormal force encountered by the earthworking implement, means interconnecting said upper and lower sections which includes a member rotatable on said upper section, interengaging means comprising intermeshing gear teeth on said member and said main beam cooperating to pivot said upper section on said beam when said lower section is moved from said operative position, and biasing means producing a force (1) for resiliently retaining said lower section in the operative position progressively increasing when said first and second abnormal forces are encountered by the tool, and (2) operative to pivot said lower section on said upper section moving said lower section to a re-entry position relative to said beam when the first abnormal force is overcome whereby the forces from the soil on the tool operate to return the tool to its operative position.

21. A tripping and cushioning mechanism as defined in claim 20 in which said gear teeth define elliptical paths on said member and said beam to thereby maintain a balance of the forces in said mechanism as said tool is moved from the operative position and in which the force of said biasing means progressively increases as the tool is moved from the operative position to return said tool to the operative position whenever the abnormal draft forces are removed.

References Cited

UNITED STATES PATENTS

| 3,420,315 | 1/1969 | Roth | 172—265 |
| 3,302,728 | 2/1967 | Sullivan et al. | 172—269 X |
| 1,219,342 | 3/1917 | Myers | 172—264 |

ROBERT E. PULFREY, Primary Examiner

W. J. CONLON, Assistant Examiner

U.S. Cl. X.R.

172—265, 266, 684, 705, 716